US011621863B1

(12) United States Patent
VanBlon et al.

(10) Patent No.: US 11,621,863 B1
(45) Date of Patent: Apr. 4, 2023

(54) AUDIO PROTECTION IN VIRTUAL MEETING

(71) Applicant: Lenovo (Singapore) Pte. Inc., Singapore (SG)

(72) Inventors: Russell Speight VanBlon, Raleigh, NC (US); Robert J Kapinos, Durham, NC (US); Scott Li, Cary, NC (US); Robert James Norton, Jr., Raleigh, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 17/517,219

(22) Filed: Nov. 2, 2021

(51) Int. Cl.
*G06F 15/16* (2006.01)
*H04L 12/18* (2006.01)
*H04L 65/4038* (2022.01)

(52) U.S. Cl.
CPC ...... *H04L 12/1831* (2013.01); *H04L 12/1818* (2013.01); *H04L 65/4038* (2013.01)

(58) Field of Classification Search
None
See application file for complete search history.

(56) References Cited

U.S. PATENT DOCUMENTS

| | | | | |
|---|---|---|---|---|
| 2017/0150305 | A1* | 5/2017 | Chaudhri | H04M 1/72412 |
| 2017/0357917 | A1* | 12/2017 | Holmes | G06Q 10/1093 |
| 2018/0130470 | A1* | 5/2018 | Lemay | G06F 3/167 |
| 2018/0174363 | A1* | 6/2018 | VanBlon | G06T 19/006 |
| 2018/0331841 | A1* | 11/2018 | Ross | H04L 41/0895 |
| 2019/0166498 | A1* | 5/2019 | Boettcher | H04M 1/66 |
| 2019/0251746 | A1* | 8/2019 | VanBlon | G06T 15/503 |
| 2019/0339784 | A1* | 11/2019 | Lemay | G06F 3/167 |
| 2020/0382637 | A1* | 12/2020 | Cranfill | H04M 3/436 |
| 2021/0399911 | A1* | 12/2021 | Jorasch | H04L 65/403 |
| 2021/0409833 | A1* | 12/2021 | Supinski | H04N 21/4884 |

FOREIGN PATENT DOCUMENTS

WO WO-2018071190 A1 * 4/2018 ............ A63F 13/211

* cited by examiner

*Primary Examiner* — Phyllis A Book
(74) *Attorney, Agent, or Firm* — Ference & Associates LLC

(57) ABSTRACT

One embodiment provides a method, including: identifying, at an information handling device, a point within a virtual meeting requiring a user to wear a headset; determining, using a processor, whether the user is wearing the headset after a predetermined time period from identification of the point; and preventing, responsive to determining that the user is not wearing the headset after the predetermined time period, the user from continuing with the virtual meeting. Other aspects are described and claimed.

18 Claims, 3 Drawing Sheets

AUDIO PROTECTION IN VIRTUAL MEETING

BACKGROUND

Advances in technology have enabled individuals to access and participate in various types of virtual meetings/conferences using their information handling devices ("devices"), for example smart phones, tablets, laptops and/or personal computers, hybrid devices, and the like. More particularly, users may join (e.g., via a conferencing application, etc.) a virtual meeting in which they may interact with other disparately-located meeting participants and view and/or listen to various types of information (e.g., documents, slides, images or videos, etc.).

BRIEF SUMMARY

In summary, one aspect provides a method, including: identifying, at an information handling device, a point within a virtual meeting requiring a user to wear a headset; determining, using a processor, whether the user is wearing the headset after a predetermined time period from identification of the point; and preventing, responsive to determining that the user is not wearing the headset after the predetermined time period, the user from continuing with the virtual meeting.

Another aspect provides an information handling device, including: a processor; a memory device that stores instructions executable by the processor to: identify a point within a virtual meeting requiring a user to wear a headset; determine whether the user is wearing the headset after a predetermined time period from identification of the point; and prevent, responsive to determining that the user is not wearing the headset after the predetermined time period, the user from continuing with the virtual meeting.

A further aspect provides a product, including: a storage device that stores code, the code being executable by a processor and comprising: code that identifies a point within a virtual meeting requiring a user to wear a headset; code that determines whether the user is wearing the headset after a predetermined time period from identification of the point; and code that prevents, responsive to determining that the user is not wearing the headset after the predetermined time period, the user from continuing with the virtual meeting.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
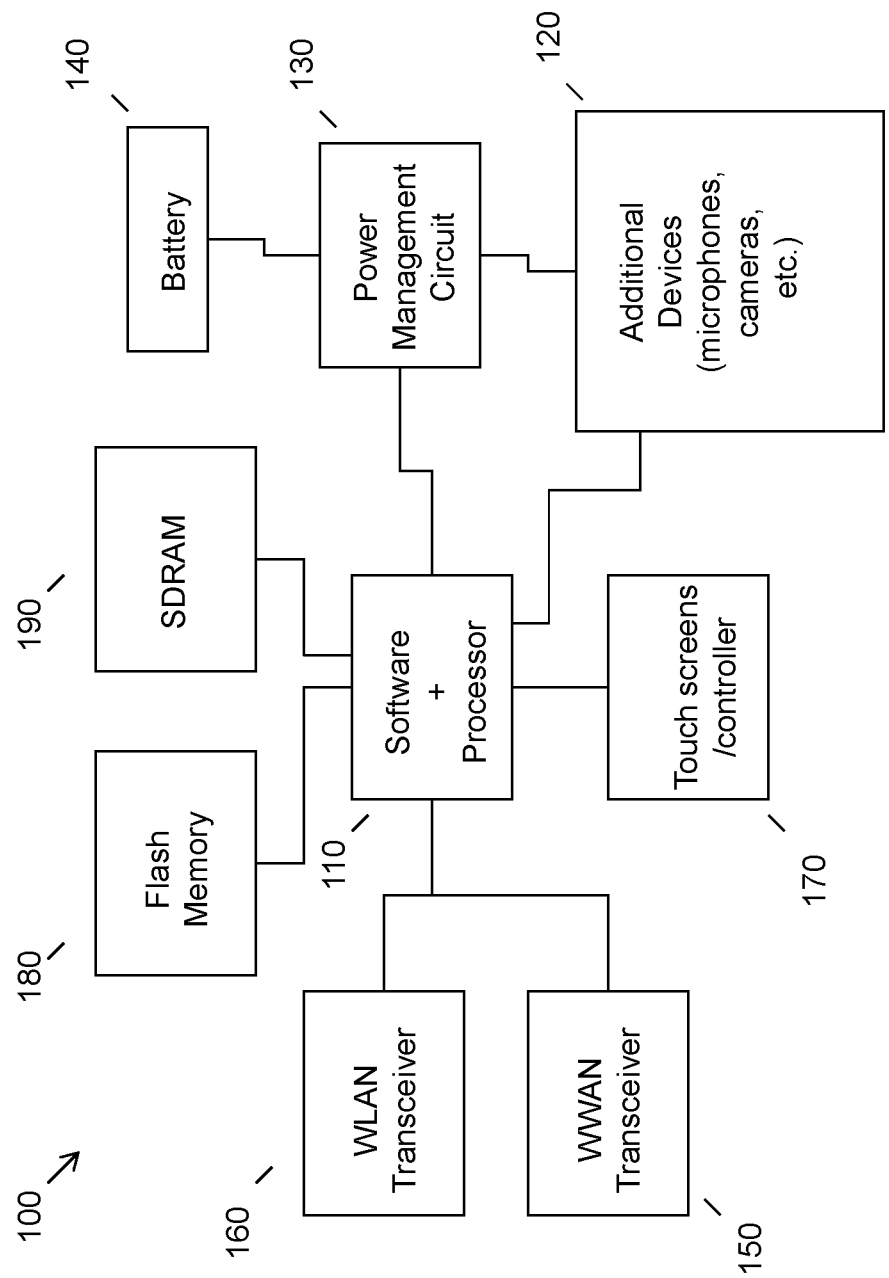
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Audio generated during a virtual meeting may be provided to a user via one or more conventional audio output devices. For example, the audio may be output through a user's headset or through one or more speakers that are integrally or operatively coupled to the user's device. With respect to the latter, other individuals in proximity to the user may also be able to hear the meeting audio. This may be an issue if private, confidential, and/or sensitive topics are being discussed in the virtual meeting.

Conventional attempts to remedy issues caused by the foregoing situation largely involve manual user involvement. For example, a user may attempt to relocate to an area where other individuals are not present. However, this may not be possible for a variety of reasons (e.g., their device and/or virtual meeting setup is not easily portable, there may be no other feasible place to conduct the virtual meeting in the user's proximity, etc.). In another example, a user could put on a headset so that only they could hear the audio from the virtual meeting. However, such a solution requires a user to be constantly vigilant of their surroundings and always utilize the headset when needed, which may be difficult for some users to do. Additionally, some users may not have a headset or may not be able to put their headset on in time to prevent the relevant content of the virtual meeting from be audibly output. Furthermore, the utilization of a headset does not prevent other proximate individuals from reading lips or closed captions on the display screen.

Accordingly, an embodiment provides a method for preventing unauthorized individuals from listening to and/or perceiving confidential virtual meeting content. In an embodiment, a point within a virtual meeting requiring a user to wear a headset may be identified. For example, an embodiment may detect that: a specific word or phrase indicative of confidential content was spoken during the meeting, a headset-only setting was activated by an administrator of the meeting, a meeting topic is sensitive, a user's location is associated with an insecure location, and the like. An embodiment may then determine whether the user is wearing a headset after a predetermined time period from the identification of the point (e.g., substantially immediately when the point is identified, thirty seconds from when the point is identified, one minute after the point is identified, etc.). Thereafter, if it is determined that the user is not wearing their headset after the predetermined time period, an embodiment may prevent the user from continuing on with the virtual meeting. Such a method may ensure that confidential matters discussed during a virtual meeting are not readily perceptible to unauthorized individuals.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
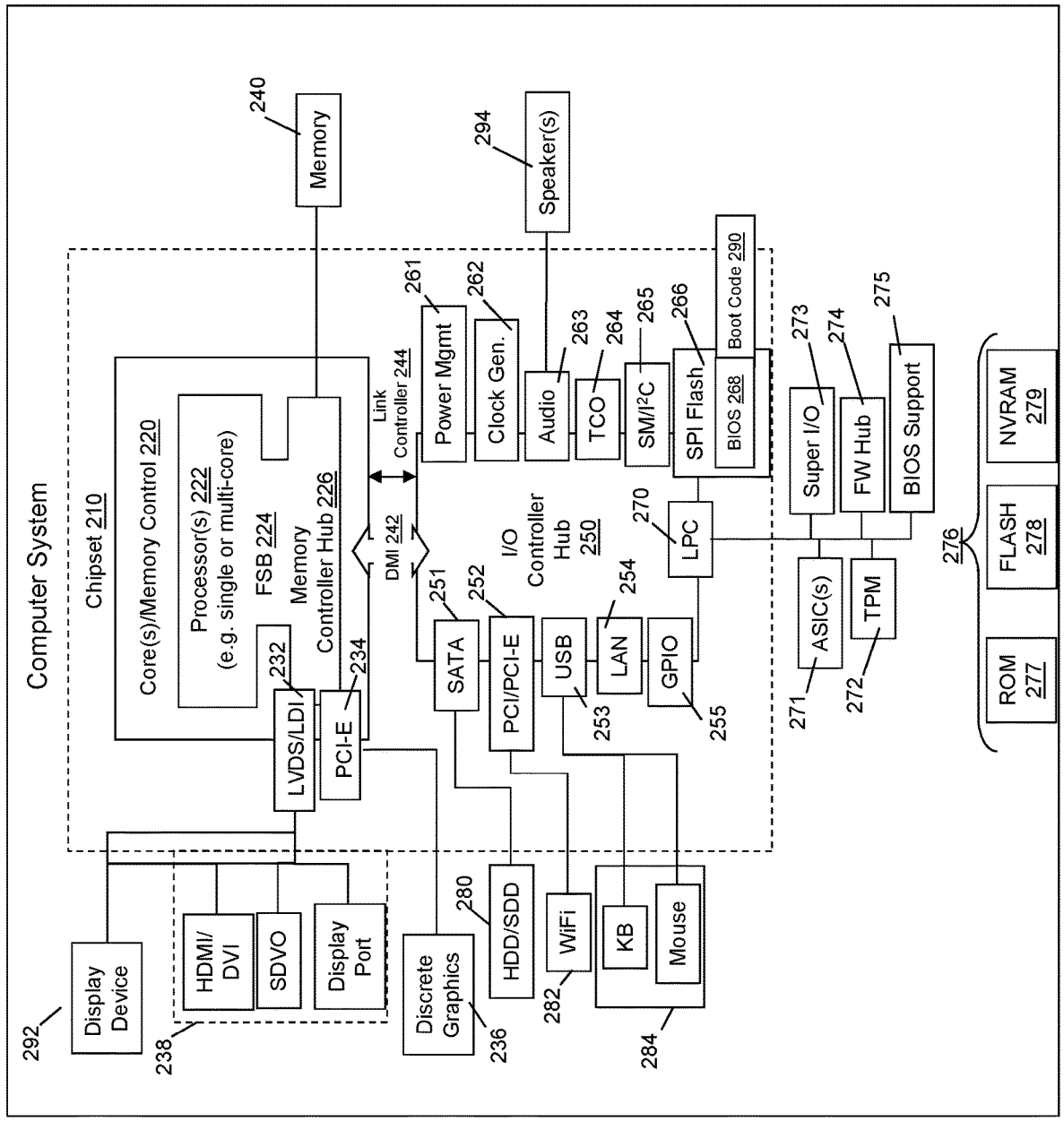
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices that enable users to connect to virtual meetings. For example, the circuitry outlined in FIG. 1 may be implemented in a smart phone, whereas the circuitry outlined in FIG. 2 may be implemented into a laptop or personal computer.

Figure 3:
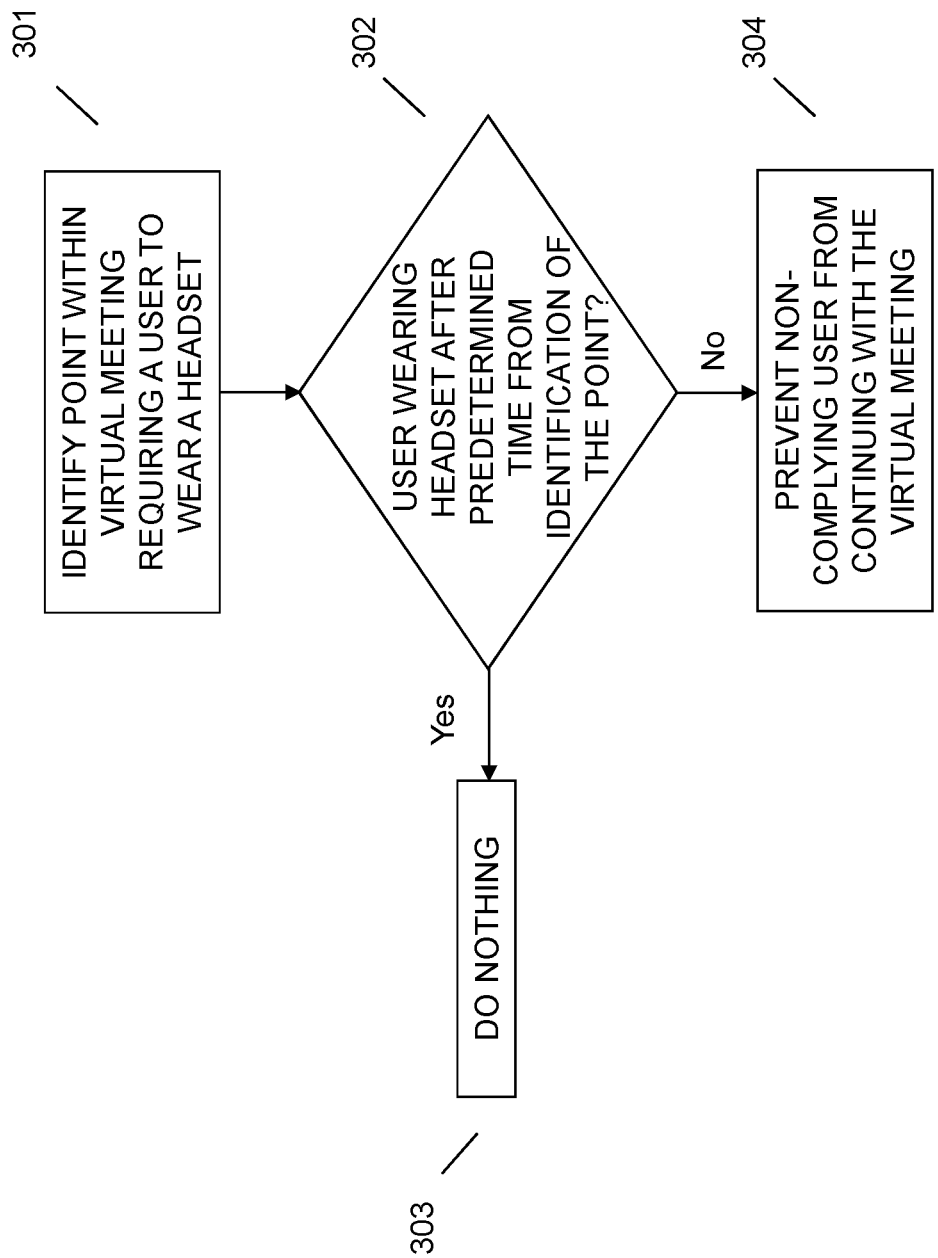
FIG. 3 illustrates an example method of preventing unauthorized individuals from listening to audio content in a virtual meeting.

Referring now to FIG. 3, an embodiment provides a method for minimizing the likelihood that unauthorized individuals may perceive confidential content in a virtual meeting. At 301, an embodiment may identify a point within a virtual meeting requiring a user to wear a headset. In the context of this application, a virtual meeting may correspond to virtually any type of online conference that a user may join (e.g., via a conferencing application, a website, a conference phone, etc.) to discuss various topics with other meeting participants. In the context of this application, a headset may correspond to a device in which output audio is generally only perceptible to the user, such as a pair of headphones, a headset microphone, or a head-mounted display (HMD) device. In an embodiment, the identification of the point may be facilitated in one or more different ways, as further described below.

In an embodiment, the identification of the point may correspond to identification that an administrator of the meeting has toggled a setting to require headsets from some or all of the meeting participants. For example, an administrator may select a "headset required" button that may be available to the meeting administrator on their user interface. In another example, an administrator may provide a command (e.g., via audio input, keyboard input, gesture input, etc.) to the virtual meeting that requires meeting participants to put on their headsets.

In an embodiment, the identification of the point may correspond to identification that a predetermined event occurring within or associated with the virtual meeting has been detected. The predetermined event may be one of a variety of different type of events, as described below.

In an embodiment, the predetermined event may be the utterance of a predetermined word or phrase by one or more meeting participants. More particularly, an embodiment may be configured to monitor for specific words or phrases in the virtual meeting that may be indicative of confidential matters. These specific words or phrases may be stored in an accessible storage database (e.g., stored locally on the device, stored remotely on another device or server, etc.) and may be configurable by a user (e.g., a meeting administrator, etc.). Responsive to detecting that one of these words or phrases has been uttered, an embodiment may associate that detection as the point within the virtual meeting at which headsets are required. As a non-limiting example of the foregoing, an embodiment may identify that a meeting administrator has stated "Remember, these matters are confidential and not to be discussed with unauthorized individuals". Upon detecting the word "confidential" in the administrators input, an embodiment may identify this as a point within the virtual meeting at which headsets are required to be worn by meeting participants.

In another embodiment, the predetermined event may be the identification of a discussion of a predetermined topic within the virtual meeting. More particularly, an embodiment may be configured to monitor and analyze the conversation of the virtual meeting (e.g., using one or more conventional conversation analysis techniques, etc.) and may then identify when certain confidential or sensitive topics are discussed. Indications of confidential topics may be stored in an accessible storage database. Responsive to detecting that one of these topics is being discussed, an embodiment may associate that detection as the point within the virtual meeting at which headsets are required to be worn. As a non-limiting example of the foregoing, an embodiment may identify that an administrator of a virtual meeting has stated "Okay, let's talk about details of Project X". An embodiment may know (e.g., via access to the confidential topic database, etc.) that Project X is confidential and may therefore identify that the initiation of a conversation associated with Project X is indicative of a point in which a headset is required to be worn by the meeting participants.

In another embodiment, the predetermined event may be the identification that a user, or their meeting-connecting device, is in a predetermined location. More particularly, an embodiment may identify whether the user or their device is in a public, high-traffic, and/or otherwise unsecured area in which other individuals are likely to be present. Such identification may be facilitated by using one or more conventional location identification techniques (e.g., GPS positioning, Wi-Fi positioning, etc.). Responsive to determining that the user or their device is in one of these unsecure areas, an embodiment may associate this determination as the point within the virtual meeting at which headsets are required to be worn. As a non-limiting example of the foregoing, an embodiment may identify that a user is connected to the virtual meeting from a coffee shop. Responsive to making this identification, an embodiment may require that a user wear their headset to participate in the virtual meeting while they are in the coffee shop.

Responsive to identifying the point in the virtual meeting requiring a headset, an embodiment may provide a visual and/or audible notification to the meeting participants that requests them to put on their headsets and/or that informs them that headsets will be required to continue with the meeting. This notification may be transmitted to the meeting participants a single time or may be transmitted to the meeting participants multiple times at predetermined intervals or until a predetermined event is detected (e.g., until it is detected that a user has connected their headset, etc.). Additionally or alternatively, the notification may persist in the meeting until an indication is received that meeting participants are no longer required to wear headsets.

At 302, an embodiment may determine whether the user is wearing the headset after a predetermined time period from identification of the point in the virtual meeting requiring the user(s) to wear a headset. This predetermined time period may be virtually any time period (e.g., substantially immediately when the point is identified, thirty seconds from when the point is identified, one minute after the point is identified, etc.) and may be adjustable by a user (e.g., an administrator of the virtual meeting, etc.).

In an embodiment, this determination may be facilitated in one or more ways. For example, an embodiment may determine whether a headset jack is physically inserted into a compatible port on the user's device within the predetermined time period. As another example, an embodiment may determine whether a headset is wireless connected to and/or paired with the user's device within the predetermined time period. In yet another example, an embodiment may utilize one or more additional sensors (e.g., camera sensors, etc.) to provide confidence to their determination. For instance, an embodiment may capture and analyze an image or video of the user to determine whether they are wearing a headset or not.

Responsive to determining, at 302, that the user is wearing the headset after the predetermined time period from identification of the point requiring headsets to be worn, an embodiment may, at 303, take no additional action. More particularly, an embodiment may allow the user to continue to participate in the virtual meeting. Conversely, responsive to determining, at 302, that the user is not wearing the headset after the predetermined time period from the identification of the point requiring headsets to be worn, an embodiment may, at 304, prevent the user from continuing on with the virtual meeting. In an embodiment, this preventative action may occur automatically and without the receipt of any additional user input.

In an embodiment, a non-complying user (i.e., a user that is determined to have not placed their headset on after the predetermined time period) may be prevented from continuing on with the meeting in a variety of different ways. For instance, an embodiment may block meeting content from being transmitted to the user or may obscure the meeting content (e.g., any images, videos, slides, documents, etc.). Alternatively, an embodiment may automatically disconnect the user from the virtual meeting. In this regard, an embodiment may dynamically kick the user out of the virtual meeting room.

Additionally or alternatively to the foregoing, an embodiment may notify an administrator of the virtual meeting of the non-complying user(s). The administrator at this point may then choose to enable access to the virtual meeting for any users who were disconnected from the virtual meeting room or whose access to meeting content may have been affected. Additionally or alternatively, a non-complying user may request to rejoin the virtual meeting or may request for meeting content to not be blocked. In response to such a request, an embodiment may again inform the user of the headset requirement and/or notify them that their meeting access will be restricted until connection of a headset is detected. Subsequent to headset detection, an embodiment may again enable the user access to the meeting.

In an embodiment, additional security measures may be invoked to ensure that unauthorized individuals do not gain access to the virtual meeting content. For instance, an embodiment may dynamically initiate volume caps for output meeting audio responsive to identifying that one or more unknown audio devices are in proximity to the user's device. More particularly, if a user's device receives signal data indicating that one or more other devices are proximate to it, an embodiment may attempt to verify that the proximate device belongs to an authorized user (i.e., a user having permission to be apprised of the contents of the virtual meeting). Such a process may be facilitated by comparing the proximate device's identifying signature to a database containing associations between known device signatures and their users. If the associated user of the proximate device is determined to not be a participant in the virtual meeting (e.g., via comparison of the proximate user's identity to a meeting list, etc.) or is determined to not have the requisite permissions to be apprised of the virtual meeting contents, an embodiment may dynamically lower the output volume of the meeting. In an embodiment, the meeting volume may be lowered by an established predetermined amount (e.g., the volume may be decreased by twenty-five percent, fifty percent, etc.). Alternatively, the meeting volume may be intelligently lowered by an amount by which the user of the proximate device likely would not be able to pick up on what is said in the meeting. In such a situation, an embodiment may identify a distance between the unknown proximate device and the user's device and thereafter decrease the output audio of the user's device by at least an amount by which it would be difficult for the unknown proximate user, situated at their distance from the user's device, to comprehend was is said in the virtual meeting.

In an embodiment, for especially sensitive content (i.e., content that has a confidentiality or sensitivity level greater than a predetermined threshold sensitivity), an embodiment may initiate further content protection measures even after determining that a user is compliant with the headset requirement. For instance, an embodiment may disable at least one non-audio output aspect of the virtual meeting. For example, an embodiment may disable closed captions to prevent a transcription of the conversation from appearing on a user's display screen. As another example, an embodiment may blur a speaker's face or lips in order to prevent a non-authorized individual from potentially deducing what the speaker is saying. In yet another example, an embodiment may activate a digital privacy filter on the user's display to prevent onlookers from seeing what is being presented in the meeting.

The various embodiments described herein thus represent a technical improvement to conventional methods of ensuring the privacy of virtual meeting contents. Using the techniques described herein, an embodiment may identify a point within a virtual meeting that requires a user to wear a headset. An embodiment may then determine whether the user is wearing the headset after a predetermined time period from identification of the point. Responsive to determining that the user is not wearing the headset after the predetermined time period, an embodiment may perform one or more actions to prevent the user from continuing on with the meeting. Such a method may ensure that conversations and topics audibly discussed in a virtual meeting are only perceptible to authorized individuals.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, at an information handling device, a point within a virtual meeting requiring a user to wear a headset by identifying that a predetermined event associated with the virtual meeting has been detected;
    determining, using a processor and at least one sensor coupled to the information handling device, whether the user is wearing the headset after a predetermined time period from identification of the point by identifying, via at least the at least one sensor, whether the headset is connected to the information handling device within the predetermined time period; and
    preventing, responsive to determining that the user is not wearing the headset after the predetermined time period and using the processor, the user from continuing with the virtual meeting by dynamically adjusting a volume level of the meeting responsive to identifying at least one unknown audio capturing device is proximate to the information handling device.

2. The method of claim 1, wherein the identifying the point comprises identifying an action initiated by an administrator of the virtual meeting.

3. The method of claim 2, wherein the action is a headset requirement selection toggled by the administrator.

4. The method of claim 1, wherein the predetermined event is selected from the group consisting of: at least one predetermined word provided by a participant in the virtual meeting, a predetermined designation associated with presented content in the virtual meeting, and a predetermined location of the information handling device.

5. The method of claim 1, wherein the preventing comprises blocking content of the virtual meeting from being transmitted to the user.

6. The method of claim 1, wherein the preventing comprises automatically disconnecting the user from the virtual meeting.

7. The method of claim 1, wherein the preventing comprises notifying an administrator of the virtual meeting that the user is prevented from continuing with the virtual meeting.

8. The method of claim 1, further comprising:
    enabling, responsive to determining that the user is wearing the headset after the predetermined time period, the user to continue with the virtual meeting;
    identifying, using a processor, that at least a portion of content presented within the virtual meeting after the predetermined time period has a sensitivity greater than a predetermined threshold sensitivity; and
    disabling at least one non-audio output aspect of the virtual meeting during presentation of the portion of the content.

9. The method of claim 8, wherein the disabling comprises performing an action selected from the group consisting of: a disabling of a closed caption setting, a blurring of a presenter's mouth, and an activation of a digital privacy filter for a display screen associated with the information handling device.

10. An information handling device, comprising:
    a processor;
    at least one sensor coupled to the information handling device
    a memory device that stores instructions executable by the processor to:
    identify a point within a virtual meeting requiring a user to wear a headset by identifying that a predetermined event associated with the virtual meeting has been detected;
    determine whether the user is wearing the headset after a predetermined time period from identification of the point by identifying, via at least the at least one sensor, whether the headset is connected to the information handling device within the predetermined time period; and
    prevent, responsive to determining that the user is not wearing the headset after the predetermined time period, the user from continuing with the virtual meeting by dynamically adjusting a volume level of the meeting responsive to identifying at least one unknown audio capturing device is proximate to the information handling device.

11. The information handling device of claim 10, wherein the instructions executable by the processor to identify the point comprise instructions executable by the processor to identify an action initiated by an administrator of the virtual meeting.

12. The information handling device of claim 11, wherein the action is a headset requirement selection toggled by the administrator.

13. The information handling device of claim 10, wherein the predetermined event is selected from the group consisting of: at least one predetermined word provided by a participant in the virtual meeting, a predetermined designation associated with presented content in the virtual meeting, and a predetermined location of the information handling device.

14. The information handling device of claim 10, wherein the instructions executable by the processor to prevent comprise instructions executable by the processor to block content of the virtual meeting from being transmitted to the user.

15. The information handling device of claim 10, wherein the instructions executable by the processor to prevent comprise instructions executable by the processor to automatically disconnect the user from the virtual meeting.

16. The information handling device of claim 10, wherein the instructions executable by the processor to prevent comprise instructions executable by the processor to notify an administrator of the virtual meeting that the user is prevented from continuing with the virtual meeting.

17. The information handling device of claim 10, wherein the instructions are further executable by the processor to:
- enable, responsive to determining that the user is wearing the headset after the predetermined time period, the user to continue with the virtual meeting;
- identify that at least a portion of content presented within the virtual meeting after the predetermined time period has a sensitivity greater than a predetermined threshold sensitivity; and
- disable at least one non-audio output aspect of the virtual meeting during presentation of the portion of the content, wherein the disabling comprises performing an action selected from the group consisting of: a disabling of a closed caption setting, a blurring of a presenter's mouth, and an activation of a digital privacy filter for a display screen associated with the information handling device.

18. A product, comprising:
- a storage device that stores code, the code being executable by a processor and comprising:
- code that identifies a point within a virtual meeting requiring a user to wear a headset by identifying that a predetermined event associated with the virtual meeting has been detected;
- code that determines, utilizing at least one sensor coupled to the information handling device, whether the user is wearing the headset after a predetermined time period from identification of the point by identifying, via at least the at least one sensor, whether the headset is connected to the information handling device within the predetermined time period; and
- code that prevents, responsive to determining that the user is not wearing the headset after the predetermined time period, the user from continuing with the virtual meeting by dynamically adjusting a volume level of the meeting responsive to identifying at least one unknown audio capturing device is proximate to the information handling device.

* * * * *